United States Patent [19]

Roesch et al.

[11] 4,178,492
[45] Dec. 11, 1979

[54] INERTIAL ELECTRIC SWITCH

[76] Inventors: Carol Roesch, 6, Chemid du Wahflock; René Heinimann, 42, rue du Tir, both of Colmar, France

[21] Appl. No.: 866,784

[22] Filed: Jan. 3, 1978

[30] Foreign Application Priority Data

Jan. 5, 1977 [FR] France .............................. 77 00797
Nov. 23, 1977 [FR] France .............................. 77 35974

[51] Int. Cl.² ........................................ H01H 35/10
[52] U.S. Cl. ........................... 200/61.45 R; 200/61.5; 200/61.53
[58] Field of Search ............... 200/61.45 R, 61.48, 200/61.5, 61.53, 318

[56] References Cited
U.S. PATENT DOCUMENTS

| 2,742,542 | 4/1956 | Bennett | 200/61.53 |
| 2,766,345 | 10/1956 | Crites | 200/61.45 R |
| 3,474,202 | 10/1969 | Bobier et al. | 200/61.45 R |
| 3,500,007 | 3/1970 | Koomer et al. | 200/61.45 R |
| 3,743,803 | 7/1973 | Roesch et al. | 200/61.45 R |
| 3,916,127 | 10/1975 | Roesch et al. | 200/61.45 R |

FOREIGN PATENT DOCUMENTS 848419 10/1939 France .............................. 200/61.45 R
649415 1/1951 United Kingdom ............. 200/61.45 R Primary Examiner—James R. Scott
Attorney, Agent, or Firm—Young & Thompson

[57] ABSTRACT

The disclosure is of an inertial electric switch, characterized in that it comprises a housing including a conical seat on to which an inertial ball is pressed by a spring, a slider carrying electrical contacts and loaded by a spring and provided with a latch of which one extremity extends through a central opening in the seat and of which the other extremity in the form of a hook cooperates with a detent recess in the lower part of the seat in order to retain the slider in the armed position of the switch, this slider upon release and displacement modifying at least one electric circuit connected to at least one of said contacts.

6 Claims, 7 Drawing Figures

FIG. 1
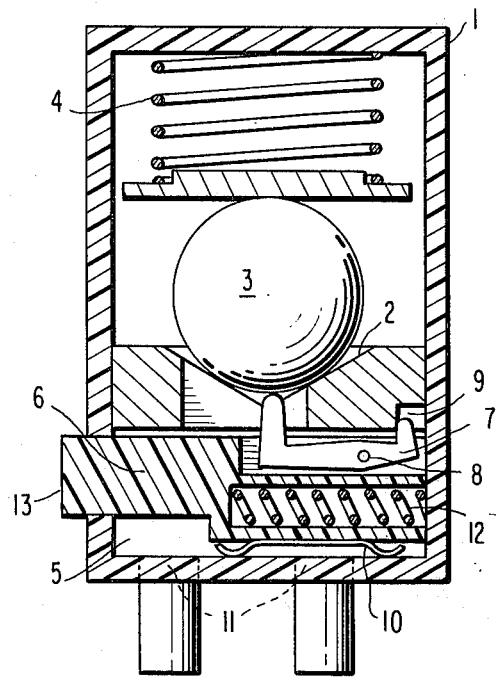
FIG. 2
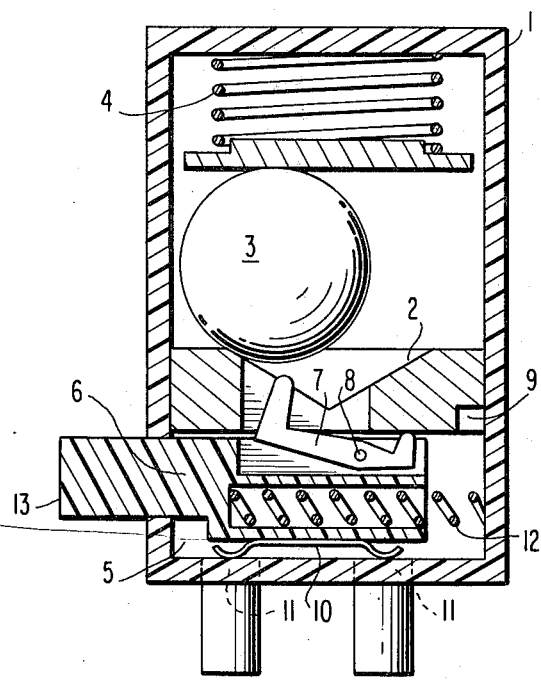
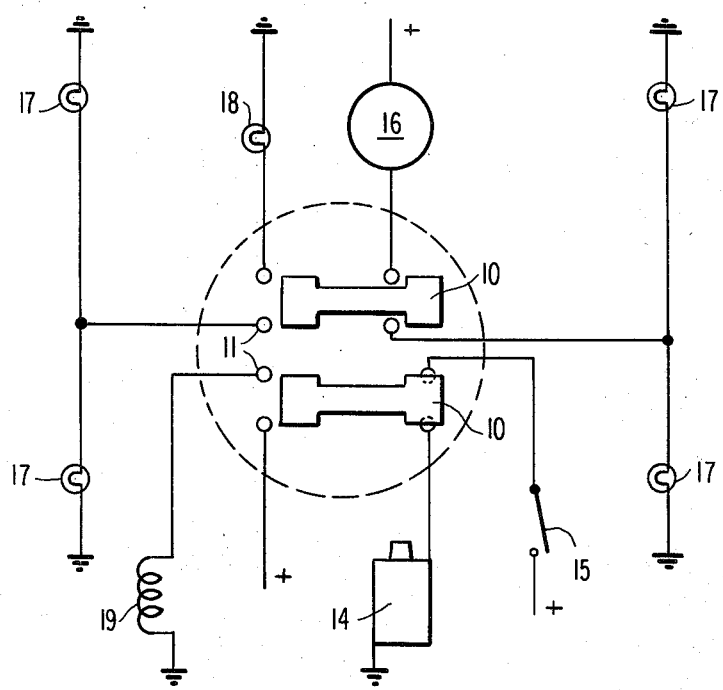
FIG. 3

INERTIAL ELECTRIC SWITCH

INTRODUCTION AND BACKGROUND OF THE INVENTION

This invention relates to an inertial electric switch operative in the case of collision or of severe vibrations or extreme acceleration or change of direction, in order to effect modification of the connections of one or more electrical circuits. This switch can be utilised in numerous instances; it can, for example, interrupt the supply of electricity and/or actuate an alarm signal upon machine tools or other electrically operated machines or apparatus at a time when vibrations or oscillations exceed the limit of security. Its applications may be numerous in connection with automobiles or other vehicles. In the case of an accident it can simultaneously release the central locking system for the doors, interrupt illumination, and activate distress signals and so on.

Many inertia switches already known are somewhat complicated and expensive and usually effect only a single function, for example to open or to close one electric circuit.

In British Patent Specifications Nos. 1,379,681 and 1,409,125 there are described inertial electric circuit-breakers which are particularly useful on motor vehicles.

The present invention has as one object to provide an inertial electric switch which can be economically constructed to be simple and efficaceous in controlling multiple contacts, and can be rapidly reset and easily mass produced.

BRIEF SUMMARY OF THE INVENTION

According to the present invention an inertial electric switch is characterised in that it comprises a housing including a conical seat on to which an inertial ball is pressed by a spring, a slider carrying electrical contacts and loaded by a spring and provided with a latch of which one extremity extends through a central opening in the seat and of which the other extremity in the form of a hook co-operates with a detent recess in the lower part of the seat in order to retain the slider in the armed position of the switch, this slider upon release and displacement modifying at least one electric circuit connected to at least one of said contacts.

FURTHER DESCRIPTION AND ADVANTAGES OF THE INVENTION

According to one feature of the invention the contact-carrying slider is disposed below the seat, and its displacement is effected perpendicularly to the vertical axis of the said seat, and the slider is provided on its side opposed to the spring by which it is loaded with a portion forming a resetting button.

According to a further feature of the invention the contact-carrying slider is provided with one or more resilient conducting blades, which during displacement slide upon contact knobs and effect the interruption and/or the making and/or the switching of one or more electrical circuits, according to the disposition of the blades and the knobs, or with one or more metallic contact elements or contact rivets.

In conformity with one modification of construction of the switch embodying the invention the contact-carrying slider is disposed parallel to the axis of the seat, and its displacement, after the release of the switch, is likewise effected parallel to this axis.

According to a further modification in the construction, the switch embodying the invention is provided with a circuit-breaker having a resetting button and reset likewise with the resetting button of the switch, or is actuatable by the latter.

The invention will be better comprehended with the aid of the following description which relates to preferred forms of construction given by way of non-limitative examples and explained with reference to the accompanying diagrammatic drawings.

BRIEF DESCRIPTION OF THE VIEWS IN THE DRAWINGS

Two switches embodying the invention are illustrated,

FIG. 1 being a sectional view of the first switch in the armed condition,

FIG. 2 is an analogous view after a shock,

FIG. 3 is a partial view showing an electric circuit diagram of a circuit possible with the switch, FIG. 4 is a sectional view of the lower part of the second switch, which is provided with a circuit-breaker, the switch and the circuit-breaker being armed, FIG. 5 is a partial sectional view, the switch being unarmed and the circuit-breaker being armed, FIG. 6 is an analogous view with the switch armed and the circuit-breaker unarmed, and FIG. 7 showing both the switch and the circuit-breaker unarmed.

DETAILED DESCRIPTION OF THE PREFERRED EMBODIMENTS

Figure 4:
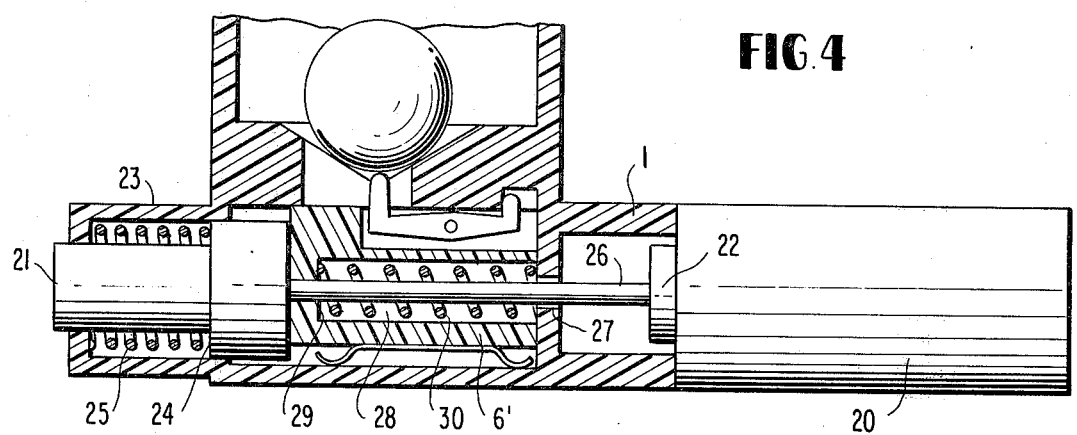

Referring to FIGS. 1 and 2, the inertial electric switch embodying the invention and shown therein comprises a housing 1 including a conical seat 2 upon which is maintained an inertial mass 3, preferably spherical, loaded by a spring 4. In a compartment 5 provided below the conical seat 2 there is accommodated a slider 6 equipped at its upper portion with a latch 7, and on its lower face with resilient metal contact blades 10 for making or breaking various circuits by co-operation with contact knobs 11.

In the case of a violent acceleration or vibrations of the switch, in the plane perpendicular to its axis, the ball 3 leaves the centre of the seat 2 and releases the latch 7 connected to the slider 6. This latch 7 then pivots about its pivot 8 and is released from a detent recess 9. Under the force of the spring 12, the slider 6 is then displaced perpendicularly to the axis of the seat 2, entraining the contact blades 10 which, during sliding, leave some of the contact knobs 11 and engage others, thus cutting some electrical circuits and completing others. In the course of the travel of the slider 6, one extremity of this latter which serves as a re-arming button 13 projects to the exterior of its lodgement in the position shown in FIG. 2 in such a manner that the button 13 can be utilised for the re-arming of the switch by simple pressure.

The switch embodying the invention may, for example, as illustrated in FIG. 3, be installed in the electrical system of a motor vehicle. With this purpose, FIG. 3 shows the disposition of the contact blades 10 with reference to the contact knobs 11 to which are connected various circuits of the vehicle, ensuring, in the case illustrated in FIG. 3, three different functions, namely the interruption of the ignition between the coil 14 and the engine by means of a contact 15 in order to minimise the risks of fire, the activation of the warning signal by means of the central flasher unit 16 which controls the flasher light bulbs 17, the corresponding contact blade likewise closing the contact of the corresponding indicator light 18, and finally the release of the central lock system by means of the electro magnet 19.

In the case of shock a switch embodying the invention can thus among other functions actuate a system for unlocking the doors of a vehicle so that if there is an accident it is possible to bring aid rapidly to any injured persons. For this purpose the switch may cause continuous supply to an electro-magnet, which is thus liable to damage.

In order to mitigate this disadvantage, in accordance with a modification of embodiment as shown in FIG. 4 the switch may be provided with a circuit-breaker 20 intended to interrupt the electric current in case this current becomes excessive, thus protecting the electrical device or devices supplied through the inertial switch. Circuit breaker 20 may be of any conventional type and for this reason is shown only schematically in the drawings. The axis of the circuit breaker 20 is advantageously alined with that of the slider 6', of which the re-arming button 21 likewise acts upon the re-arming button 22 of the circuit-breaker 20, or is influenced by this latter.

The re-arming button 21 of the slider 6' is disposed in a guide 23 and has a shoulder 24 upon which bears a return spring 25 intended to maintain the button in the armed position. On the side opposite to the shoulder 24, the button 21 is provided with a push rod 26 of small diameter extending through the slider 6' and extending out of the housing 1 through an opening 27 provided for this purpose, in order to push against the button 22 of the circuit-breaker 20 or to be influenced by this latter.

Moreover the slider 6' is provided with a chamber 28 extending around the push rod 26 as far as an interior shoulder 29, and serving for the reception of a spring 30 loading the slider 6'.

Figure 5:
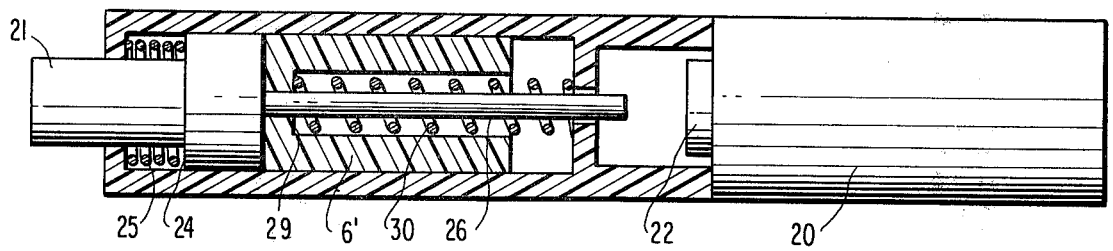

Upon the release of the switch, the slider 6' abuts the button 21 and pushes this latter towards the exterior (FIG. 5) under the action of the spring 30. The reengagement or re-arming of the switch can be effected simply by action upon the resetting button 21 which moves the slider 6' into its cocked position.

Figure 6:
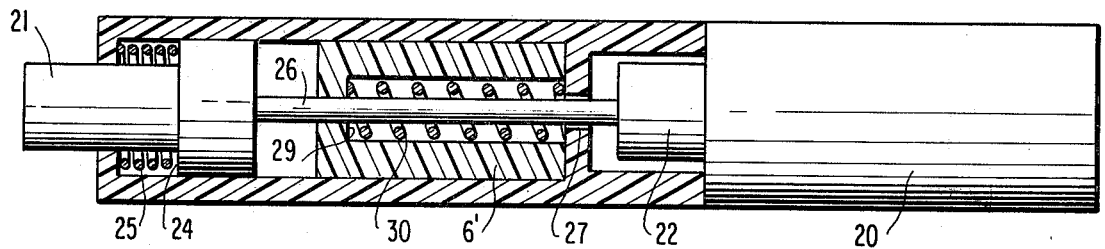

In the case of release of the circuit-breaker 20 alone, represented in FIG. 6, the resetting button 22 of the said circuit-breaker 20 pushes upon the rod 26 which transmits the motion to the button 21. The re-arming of the circuit-breaker 20 is effected by pushing upon the button 21 which in turn pushes upon the button 22 through the intermediary of the rod 26.

Figure 7:
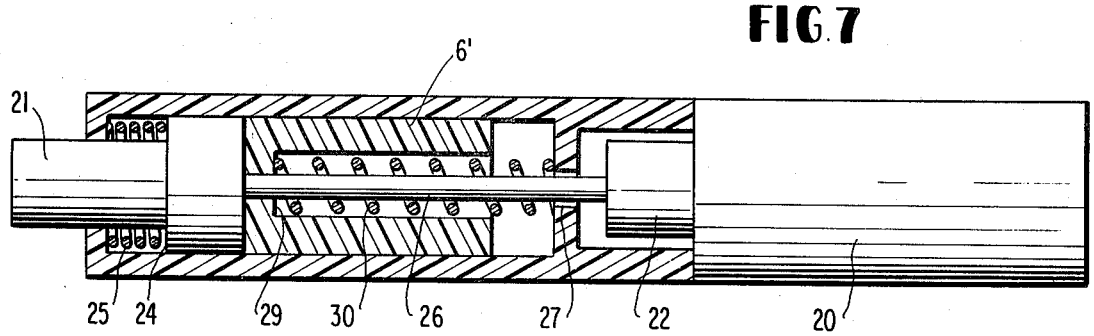

Finally, FIG. 7 illustrates an instance of simultaneous release of the switch and of the circuit-breaker, the button 21 then being abutted directly by the slider 6', and also loaded by the button 22 through the intermediary of the rod 26.

It will be well understood that the invention is not restricted to the forms of construction described with reference to and illustrated in the accompanying drawings. Modifications remain possible, notably from the point of view of the constitution of the various components, without in any way departing from the scope of protection of the invention as defined in the following claims.

What is claimed is:

1. An inertial electric switch, comprising a housing, a conical seat in said housing, an inertial ball in said housing, a spring in said housing that presses said ball onto said seat, a slider mounted for sliding movement in said housing in a direction perpendicular to the axis of said conical seat between an armed position and an unarmed position, first electrical contacts carried by said slider, second electrical contacts fixedly carried by said housing in a position to be engaged with and disengaged from said first contacts in accordance with the said position of said slider in said housing, means for urging said slider from said armed toward said disarmed position, a latch swingably carried by said slider, said latch having two ends and being mounted for swinging movement on said slider about an axis spaced between said two ends, one of said ends extending through a central opening in said seat a distance sufficient to contact said ball when said ball is centered on said seat, the other of said ends comprising a hook that is adapted to engage in a recess in said housing, said ball contacting said one arm to maintain said latch in a position such that said hook is maintained in said recess in said armed position of said slider, and a resetting button to move said slider from said disarmed to said armed position.

2. A switch as claimed in claim 1, said means to move said slider from said armed to said disarmed position comprising a spring acting between said slider and said housing.

3. A switch as claimed in claim 1, in which said means for moving said slider from said armed position to said disarmed position comprises a circuit-breaker having a resetting button that, upon actuation of the circuit-breaker, effects said movement of said slider.

4. A switch as claimed in claim 3, said first-named resetting button having a shoulder that engages said slider to press said slider to said one position, said first-named resetting button having a rod of smaller diameter than said slider, which extends through the slider and abuts said resetting button of the circuit-breaker.

5. A switch as claimed in claim 4, and a spring that acts between said slider and said housing to urge said slider from said armed toward said disarmed position.

6. A switch as claimed in claim 1, said first contacts comprising at least one electrically conductive resilient blade.

* * * * *